United States Patent
Fossum et al.

(10) Patent No.: US 8,924,690 B2
(45) Date of Patent: Dec. 30, 2014

(54) APPARATUS AND METHOD FOR HETEROGENEOUS CHIP MULTIPROCESSORS VIA RESOURCE ALLOCATION AND RESTRICTION

(75) Inventors: Tryggve Fossum, Northborough, MA (US); George Chrysos, Milford, MA (US); Todd A. Dutton, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/482,713

(22) Filed: May 29, 2012

(65) Prior Publication Data

US 2012/0239875 A1 Sep. 20, 2012

Related U.S. Application Data

(63) Continuation of application No. 10/884,359, filed on Jul. 2, 2004, now Pat. No. 8,190,863.

(51) Int. Cl.
| | | |
|---|---|---|
| G06F 9/30 | (2006.01) | |
| G06F 9/38 | (2006.01) | |
| G06F 9/50 | (2006.01) | |
| G06F 1/32 | (2006.01) | |

(52) U.S. Cl.
CPC ............ *G06F 9/3836* (2013.01); *G06F 9/3802* (2013.01); *G06F 9/5094* (2013.01); *Y02B 60/1282* (2013.01); *G06F 9/3869* (2013.01); *G06F 9/30181* (2013.01); *G06F 1/3287* (2013.01); *Y02B 60/1278* (2013.01); *G06F 1/3203* (2013.01); *G06F 9/5061* (2013.01)
USPC ............................ 712/214; 718/105; 712/229

(58) Field of Classification Search
None
See application file for complete search history.

(56) References Cited

U.S. PATENT DOCUMENTS

| | | | | |
|---|---|---|---|---|
| 5,457,789 A | * | 10/1995 | Dietrich et al. | ............... 711/100 |
| 5,708,788 A | * | 1/1998 | Katsuno et al. | ............... 712/214 |
| 5,719,800 A | | 2/1998 | Mittal et al. | |
| 5,896,528 A | | 4/1999 | Katsuno et al. | |
| 6,237,073 B1 | * | 5/2001 | Dean et al. | ..................... 711/202 |

(Continued)

FOREIGN PATENT DOCUMENTS

EP          1 182 552 A2     2/2002

OTHER PUBLICATIONS

Foreign counterpart Patent Application No. 09414100, mailed Nov. 11, 2011, pp. 22.

(Continued)

*Primary Examiner* — William B Partridge
(74) *Attorney, Agent, or Firm* — Blakely, Sokoloff, Taylor & Zafman LLP

(57) ABSTRACT

A method and apparatus for heterogeneous chip multiprocessors (CMP) via resource restriction. In one embodiment, the method includes the accessing of a resource utilization register to identify a resource utilization policy. Once accessed, a processor controller ensures that the processor core utilizes a shared resource in a manner specified by the resource utilization policy. In one embodiment, each processor core within a CMP includes an instruction issue throttle resource utilization register, an instruction fetch throttle resource utilization register and other like ways of restricting its utilization of shared resources within a minimum and maximum utilization level. In one embodiment, resource restriction provides a flexible manner for allocating current and power resources to processor cores of a CMP that can be controlled by hardware or software. Other embodiments are described and claimed.

20 Claims, 11 Drawing Sheets

(56) References Cited

U.S. PATENT DOCUMENTS

| | | | |
|---|---|---|---|
| 6,304,978 B1 | 10/2001 | Horigan et al. | |
| 6,539,368 B1* | 3/2003 | Chernikov et al. | 706/41 |
| 6,564,328 B1* | 5/2003 | Grochowski et al. | 713/320 |
| 6,636,949 B2* | 10/2003 | Barroso et al. | 711/141 |
| 6,662,278 B1 | 12/2003 | Kahn et al. | 711/154 |
| 6,826,747 B1* | 11/2004 | Augsburg et al. | 717/128 |
| 7,174,469 B2* | 2/2007 | Luick | 713/300 |
| 2003/0065960 A1* | 4/2003 | Rusu et al. | 713/300 |
| 2003/0126478 A1* | 7/2003 | Burns et al. | 713/300 |
| 2003/0126479 A1* | 7/2003 | Burns et al. | 713/300 |
| 2003/0131274 A1 | 7/2003 | Mizuyabu et al. | |
| 2004/0019738 A1 | 1/2004 | Kahn et al. | |
| 2004/0044915 A1* | 3/2004 | Bose et al. | 713/320 |
| 2005/0060597 A1* | 3/2005 | Albonesi et al. | 713/600 |

OTHER PUBLICATIONS

First Office Action from foreign counterpart China Patent Application No. 200580022604.5 mailed Feb. 15, 2008, pp. 16.

Second Office Action from foreign counterpart China Patent Application No. 200580022604.5 mailed Aug. 15, 2008, pp. 11.

Patent Grant from foreign counterpart China Patent Application No. 200580022604.5 mailed Jul. 17, 2009, pp. 2.

Decision to Grant from foreign counterpart Japan Patent Application No. 2007-519337 mailed Jun. 11, 2010, p. 1.

PCT International Search Report for foreign counterpart Patent Application No. PCT/US2005/022773 mailed Oct. 18, 2005, pp. 4.

PCT International Written Opinion for foreign counterpart Patent Application No. PCT/US2005/022773 mailed Oct. 18, 2005, pp. 5.

Non-Final Notice of Reasons for Rejection for Japanese Application No. 2007-519337, mailed Jun. 30, 2009, pp. 5.

PCT, International Preliminary Report on Patentability for International Application No. PCT/US2005/022773, mailed Jun. 25, 2005, pp. 4.

* cited by examiner

APPARATUS AND METHOD FOR HETEROGENEOUS CHIP MULTIPROCESSORS VIA RESOURCE ALLOCATION AND RESTRICTION This application is a continuation of U.S. patent application Ser. No. 10/884,359, filed on Jul. 2, 2004 now U.S. Pat. No. 8,190,863, entitled, "Apparatus and Method for Heterogeneous Chip Multiprocessors Via Resource Allocation and Restriction."

FIELD OF THE INVENTION

One or more embodiments of the invention relate generally to the field of integrated circuit and computer system design. More particularly, one or more of the embodiments of the invention relate to a method and apparatus for heterogeneous chip multiprocessors via resource allocation and restriction.

BACKGROUND OF THE INVENTION

Chip multiprocessors (CMPs) will become mainstream by the end of the decade. Contemporary CMPs are built using a "copy-exactly" approach. In CMPs built using the copy-exactly approach, all central processing units or processing cores (CPUs) on a CMP are identical, having exact copies of ALUs, caches and pipelines. This approach minimizes the design complexity of CMPs, since only one CPU needs to be designed, but is instantiated multiple times.

Some software applications are sensitive to single thread performance, and others are sensitive to multi-thread or throughput performance. For those applications that are sensitive to single thread performance, and can benefit from more resources, it is desirable to allocate more resources to the CPU running the single thread, and less to those CPUs that are running less performance sensitive threads. For those applications that are sensitive to multi-thread performance, it is beneficial to share resources more uniformly amongst all threads. Additionally, applications may themselves vary, sometimes being more performance sensitive to a single thread, and other times to all threads.

CMPs in development also must deal with a limit on power dissipation and current draw. For example, if all CPUs are fully active simultaneously, voltage and frequency must be lowered to ensure that the CMP stays below the current and power limits. However, if a single CPU is active, the voltage and frequency can be set to the maximum voltage and frequency and all available resources allocated thereto. If power and current is allocated per-CPU, the CPUs allocated more power could run programs faster relative to other CPUs that are allotted less. With added intelligence (either directives by software, or inferences by software or hardware algorithms), a CMP could allocate power to improve the performance of one or more particular threads of execution, or balance power to maximize throughput of all threads. Thus chip power becomes a resource to be allocated.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for heterogeneous chip multiprocessors (CMP) via resource restriction. In one embodiment, the method includes the accessing of a resource utilization register to identify a resource utilization policy. Once accessed, a processor controller ensures that the processor core utilizes a shared resource in a manner specified by the resource utilization policy. In one embodiment, each processor core within a CMP includes an instruction issue throttle resource utilization register, an instruction fetch throttle resource utilization register and other like ways of restricting its utilization of shared resources within a minimum and maximum utilization level. In one embodiment, resource restriction provides a flexible mechanism for allocating current and power resources to processor cores of a CMP that can be controlled by hardware or software.

System

Figure 1:
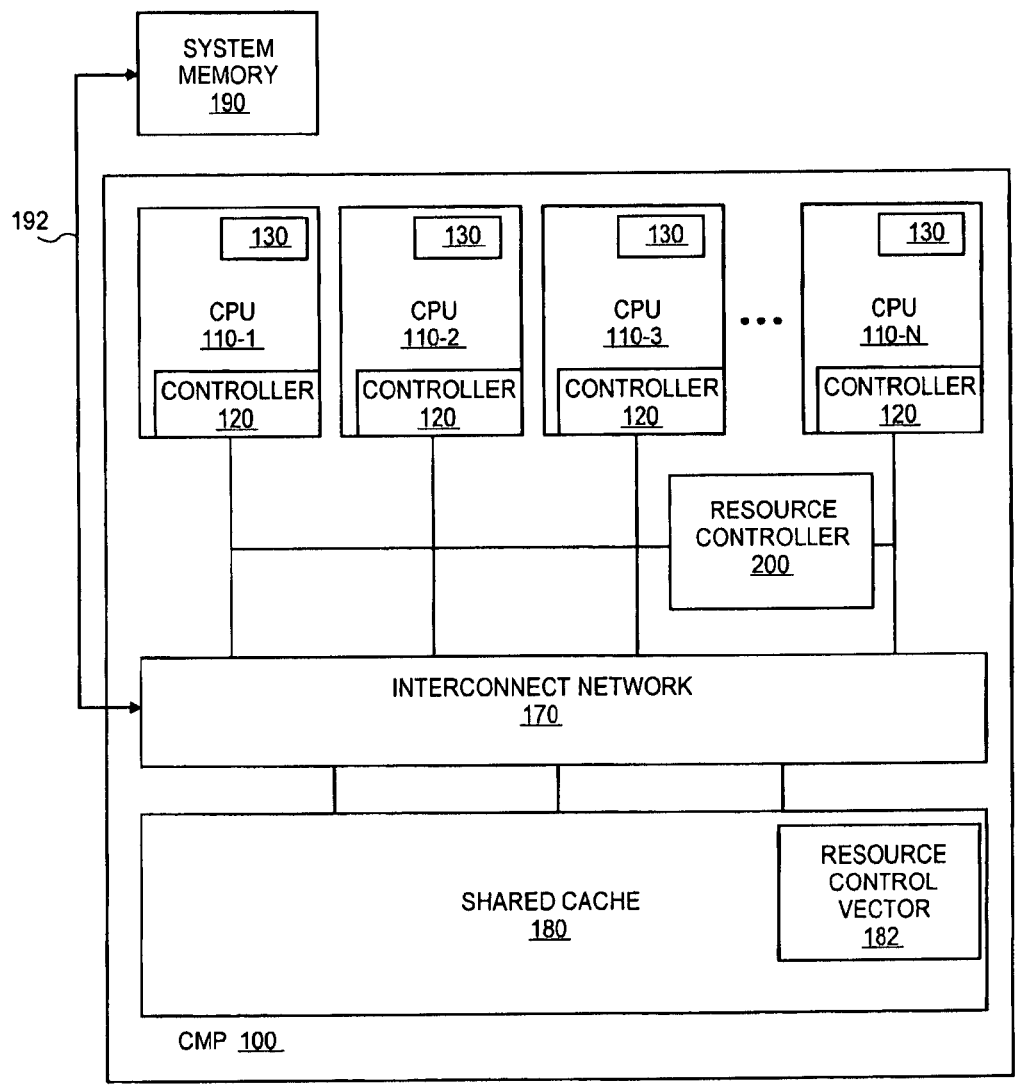
FIG. 1 is a block diagram illustrating a chip multiprocessor (CMP) including one or more processor cores having a processor controller to limit processor activity to ration CMP resources, in accordance with one embodiment.

FIG. 1 is a block diagram illustrating a chip multi-processor (CMP) 100 including processor cores (CPU) 110 (110-1, ..., 110-N) having a processor controller and at least one resource utilization register 130 (130-1, ..., 130-N) to restrict CPU 110 activity according to at least one resource restriction or allocation during at least one program cycle, in accordance with one embodiment. Representatively, CMP 100 contains the plurality of CPUs 110, shared cache and other functions, fabricated on the same die. As illustrated, CPUs 110 are coupled to interconnection network 170 to access shared cache 180. In one embodiment, each CPU 110 includes a throttle resource utilization register 130 that is written by privileged software to restrict CPU 110 utilization of a restricted resource from a minimum to a maximum utilization level.

In one embodiment, CPUs 110 access system memory 190 via system memory bus 192 coupled to interconnection network 170. In one embodiment, system memory 190 may include, but is not limited to, a double-sided memory package including memory modules comprised of random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed temporary storage of data in each memory module.

CMP designs, such as CMP 100, have resources which are shared among running programs including: shared cache, shared memory ports, shared power supply, etc. While the average usage may be okay, occasionally programs can get into synchronized patterns which lead to excessive demand on some shared resources, causing extra queuing delays and maybe live-locks or deadlocks Accordingly, in one embodiment, CMP resource restriction is used to limit access to shared CMP resources by restricting processor core activity to shared CMP resources to avoid such problems.

In one embodiment, resource allocation directs shared CMP resource to restrict the number of resource requests per cycle for at least one processor core of CMP 100. In another embodiment, resource allocation limits utilization of a resource by restricting the number of concurrent resource requests outstanding to a fixed number for at least one processor core of CMP 100. In another embodiment, resource allocation reserves more of a flexibly partitioned resource for one or more processor cores than for one or more other processor cores of CMP 100.

As illustrated in FIG. 1, each CPU 110 includes an activity throttling resource utilization register 130. In one embodiment, each activity throttle vector is populated to define a processor core resource activity level during one or more program cycles from one of a minimum activity level to a maximum activity level regarding a processor resource. In one embodiment, as illustrated with reference to FIG. 2, the minimum activity level refers to a disabled or zero activity level. In one embodiment, activity throttle vectors 130 may limit the processor activity level to a percentage of resource utilization per cycle and over a number of cycles.

In one embodiment, activity throttle vectors 130 may include an instruction issue throttle vector to limit a maximum issue rate of the processor per instruction cycle. For example, instruction issue restriction may occur via limiting the maximum instruction issue rate to two instructions per program cycle when the processor could otherwise issue four instructions per cycle. In one embodiment, the kind of instruction can be restricted based on power consumed or other required resources.

As described herein, resource restriction may include resource control vectors to provide resource rationing, such as buffer restriction (e.g., restricting the number of memory references in flight), cache way restriction, as well as other forms of resource allocation. In one embodiment, cache way accesses in shared cache 180 are allocated at the central cache level by the cache tracking which core makes the request and allocating the resulting data in a subset of the cache according to resource control vector 182. In one embodiment, allocation to a central queue of memory requests is performed according to a resource control vector. In one embodiment, a controller, or privileged software, populates the resource control vector by setting a maximum limit for each processor core. In one embodiment, activity of a program against the allocated resource control vectors are monitored and the allocation of resources can be adjusted to best fit the overall profile of the aggregate program activity of the system.

Figure 2:
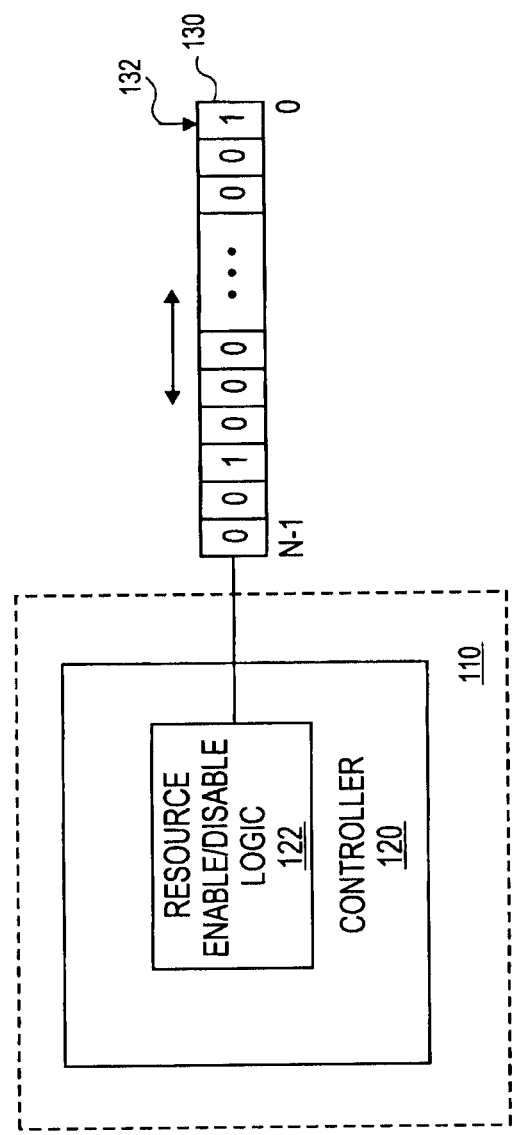
FIG. 2 is a block diagram further illustrating a processor controller, as illustrated in FIG. 1, in accordance with one embodiment.

In one embodiment, activity throttle vector 130 is an N-bit barrel shift register that is writable by privileged software, as shown in FIG. 2. FIG. 2 is a block diagram further illustrating a processor controller 120, as illustrated in FIG. 1, in accordance with one embodiment. Representatively, bit position 132 of activity throttle vector 130 indicates whether a resource is allowed to be used in a given cycle. In one embodiment, the content of throttle vector 130 is shifted every cycle. In one embodiment, as illustrated in FIG. 2, each CPU 110 includes a processor controller 120 having resource enable/disable logic 122.

Representatively, resource enable/disable logic 122 accesses current bit position 132 of corresponding throttle vector 130. Representatively, current bit position 132 is set to indicate full availability of a respective processor resource within the current or upcoming program cycle. Conversely, in one embodiment, current bit position 132 is de-asserted to indicate unavailability of a respective processor resource within the current or upcoming program cycle. In an alternate embodiment, an activity level is specified by activity throttle vectors for a minimum activity range to a maximum activity range. As is described below, CPUs 110 may include multiple throttle vectors, which may control processor activity, such as processor instruction issue, processor instruction fetch, floating point (FP) instruction issue, integer instruction issue, memory request issue or other like CPU activity.

Accordingly, in one embodiment, during each program or clock cycle, processor controller 120, via resource enable/disable logic 122, accesses current bit position 132 of activity throttle vector 130 to determine whether to allow processor access to a resource during the respective cycle. Accordingly, in one embodiment, the storage of an N-bit value within throttle vector 130 enables, for example, privileged software to define CPU 110 activity in $1/N^{th}$ program cycle increments from a minimum activity level to a maximum activity level. As used herein, "N" is an integer. In one embodiment, resource enable/disable logic 122 is implemented using a state machine, micro-code, or integrated circuit logic Referring again to FIG. 1, in one embodiment, a CMP 100 includes an activity throttle vector 130 per CPU 110, where the vector 130 allows or disallows instruction issue in any given cycle. In one embodiment, CPU 110 is only allowed to issue instructions when the throttle vector's 0'th bit position is a "1" (set). If the throttle vectors are 16 bits each, software can limit the instruction issue activity of each CPU in $1/16^{th}$ increments from no activity to full activity. Some processor resources may not permit this full range, but a throttle vector may be used to control the activity level between some minimum level and some maximum level.

As described herein, the various signals detected or issued by components of CMP 100, such as CPUs 110, resource controller 200, or other system component may represent active high or active low signals. Accordingly, as described herein, the terms "assert", "asserting", "asserted", "set", "setting", "de-assert", "de-asserted", "de-asserting" or other like terms may refer to data signals, which are either active low or active high signals. Therefore, such terms, when associated with the signal, are interchangeably used to require or imply either active low or active high signals.

Figure 3A:
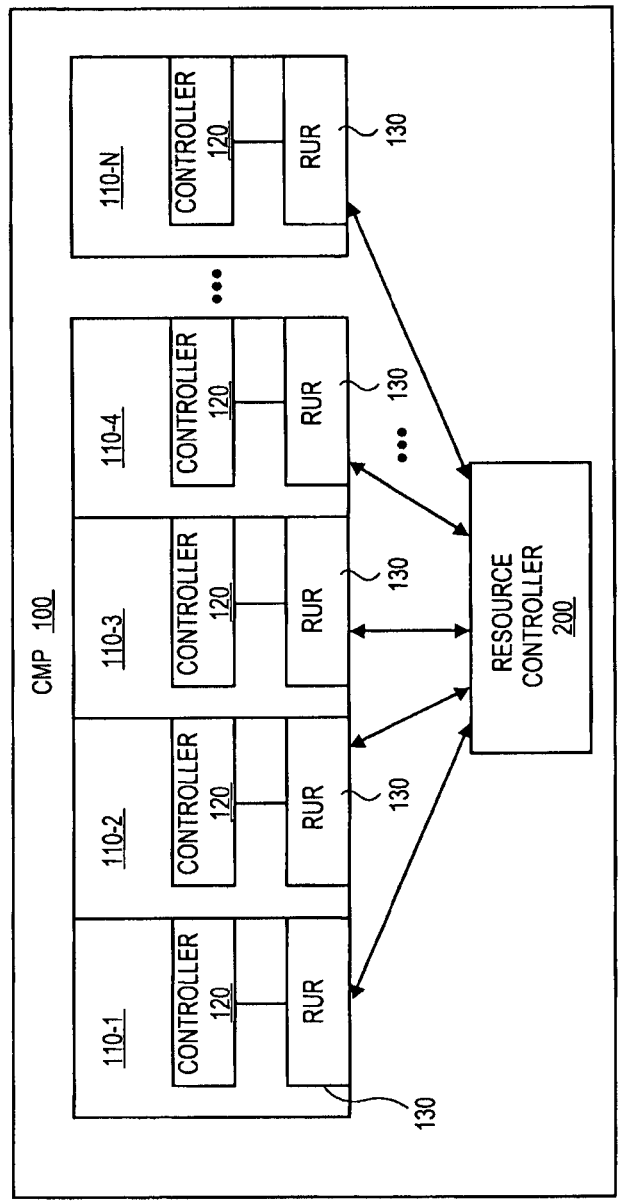
FIG. 3A is a block diagram further illustrating the CMP of FIG. 1 and associated processor cores to provide resource restriction, in accordance with one embodiment.

FIG. 3A illustrates CMP 100 with resource utilization registers (RUR) 130 in accordance with one embodiment. In one embodiment, RUR 130 are CSRs (configuration system registers, mapped in protected I/O address space, and writable by privileged software) to provide a utilization policy for a restricted resource. Representatively, CPUs 110 communicate status information to resource controller 200. In one embodiment, snapshots of the actual issued processor instruction processed count (IPC) of CPUs 110 are reported by incrementing a counter in e.g., CPU 110-1 every time the CPU 110-1 issues an instruction and conveying counter overflows to power controller 200.

In one embodiment, each CPU 110 keeps track of performance characteristics of the executing program. This information is conveyed to resource controller 200. In one embodiment, resource controller 200 can then decide to re-allocate resources to improve overall performance of CMP 100 by populating resource control vectors of shared CMP resources such as resource control vector 182 of shared cache 180. This re-allocation happens while programs are executing, without any disruption of service. For example, if a parallel program is running and most of CPUs 110 have reached a synchronization point while one or more are still executing, resource controller 200 can be dynamically shift resources from the early finishers to the stragglers to improve CMP performance. In one embodiment, power controller 200 may be implemented using a state machine, micro-code or integrated circuit logic.

Figure 3B:
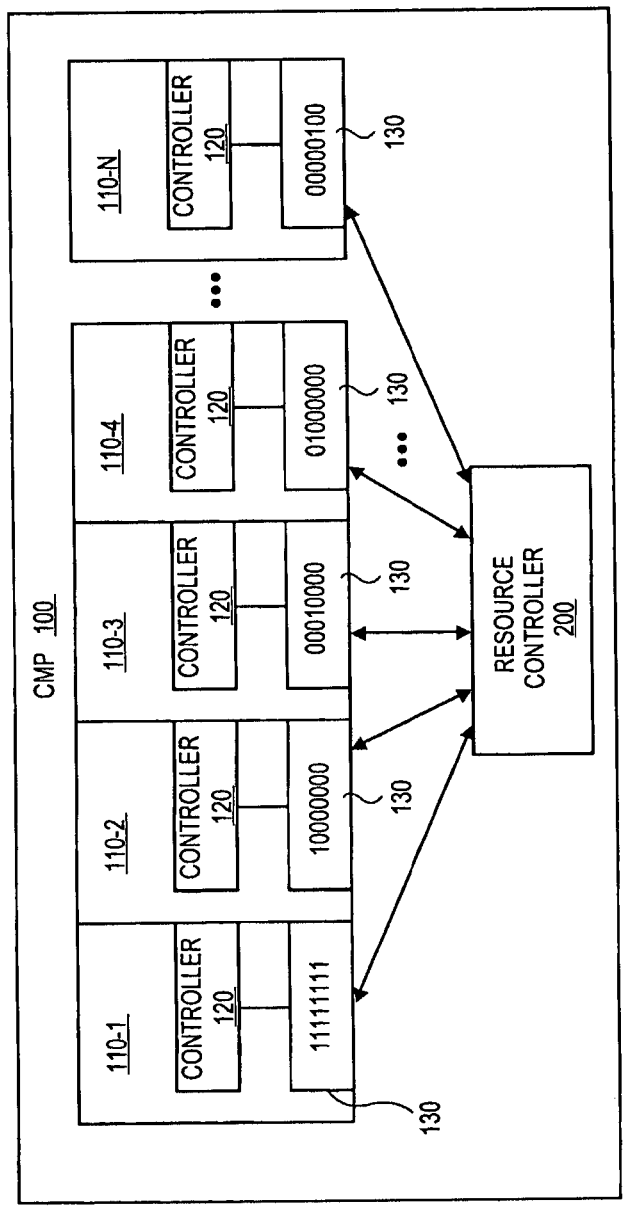
FIG. 3B is a block diagram further illustrating the CMP of FIG. 1 and associated processor cores to provide processor activity throttling, in accordance with one embodiment.

FIG. 3B is a block diagram illustrating CMP 100 with instruction issue activity throttle vectors 130. Representatively, CPU 110-1 has been prioritized over CPUs 110-2-110-N by setting its issue throttle vector 130 to all 1's while CPUs 110-2-110-N are restricted to issue instructions one out of eight cycles to conserve power. In one embodiment, the imbalance of CPUs 110 of CMP 100 is performed such that a high performance CPU 110-1 is given to the thread which is most performance critical. As a result, CMP 100 provides executed programs with the benefit of parallelism, while avoiding the frequent obstacle where a section of the work is serialized and becomes a limit to the overall performance improvement provided by parallel execution.

In one embodiment, a processor core may be selected to perform a less resource intensive application thread, such as, for example, a helper thread. Helper Threads are an emerging technology, where some threads run ahead of another thread, imitating its workload, thus creating a prefetch effect of its memory data, yet without doing the work of the actual program. The resource requirements for a helper thread can be quite minimal, making it suitable for reduced resource allocation to save power for a main thread.

Figure 4:
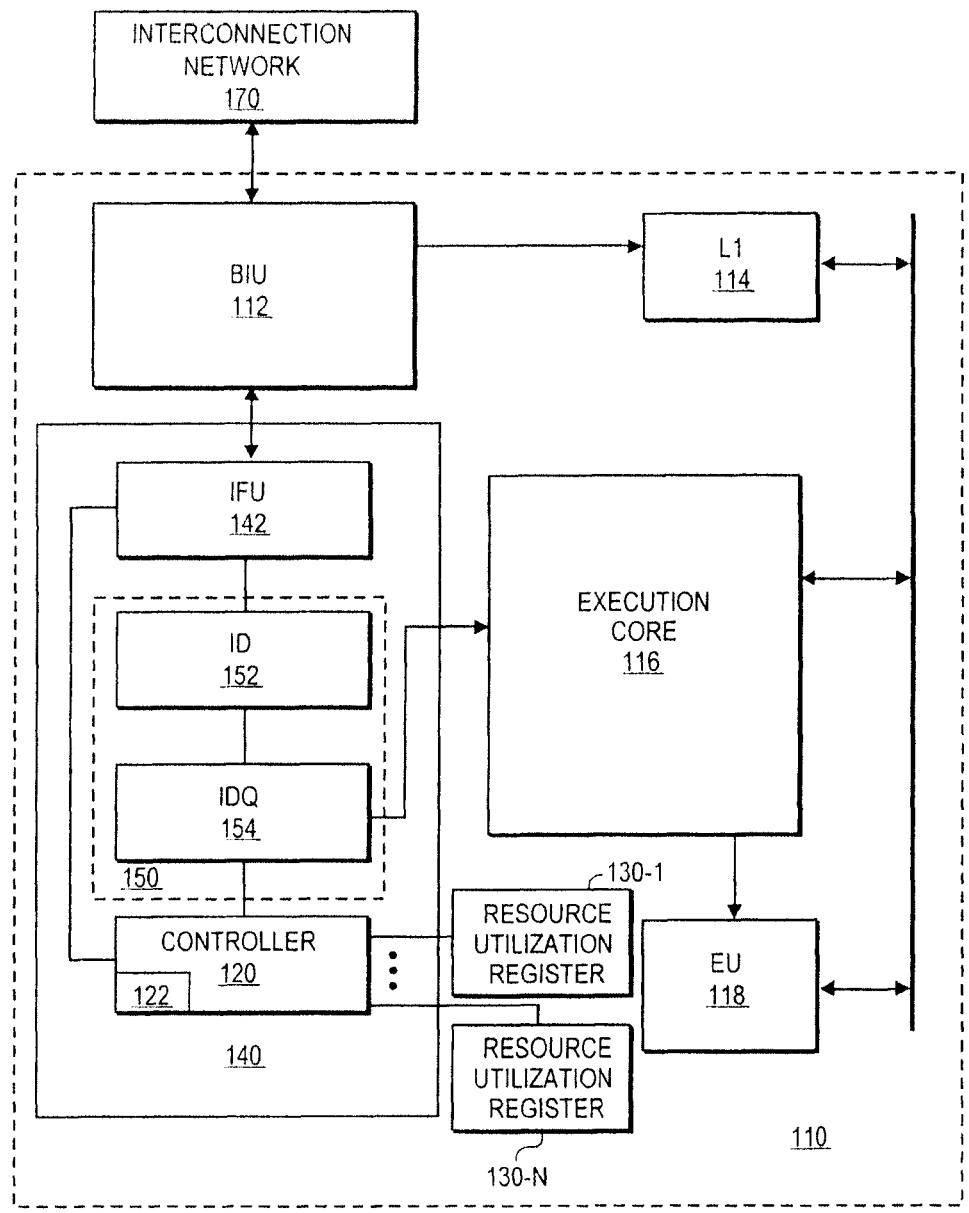
FIG. 4 is a block diagram further illustrating a processor core of FIG. 3, in accordance with one embodiment.

FIG. 4 is a block diagram further illustrating a microarchitecture of CPU 110 to further illustrate CPU activity throttling directed to CPU resources, in accordance with one embodiment. In the embodiment illustrated, CPU 110 is configured to perform dynamic execution. However, those skilled in the art will recognize that CPUs 110 within CMP 100 are not required to perform dynamic execution to fall within the scope of the embodiments described herein. As described herein, dynamic execution refers to the use of front-end logic 140 to fetch the next instructions according to program order and prepare the instructions for subsequent execution in the system pipeline.

Representatively, front-end logic 140 is comprised of an instruction fetch unit (IFU) 142 which fetches the upcoming program instructions for execution and prepares the instructions for future use within the system pipeline. In effect, instruction issue logic of front-end logic 140 supplies a high bandwidth stream of decoded instructions to execution core 116, which directs execution (the actual completion) of the instructions. Accordingly, front-end logic 140 may include an instruction fetch unit (IFU) 142 for fetching macro-instructions from, for example, shared cache 180 via bus interface unit (BIU) 112.

Once the instructions are fetched, the instructions are decoded into basic operations, referred to herein as micro-operations (uOPs), which the execution units (EU) 118 execute. In other words, IFU 142 fetches a macro-instruction from, for example, shared cache 180, which is provided to instruction decoder (ID) 152 of instruction issue logic 150. In response to the received macro-instruction, ID 152 will decode the macro-instruction into one or more uOPs which are provided to instruction decoder queue (IDQ) 154.

In one embodiment, front-end logic 140 includes processor controller 120, including resource enable/disable logic 122. Representatively, processor controller 120 is coupled to one or more resource utilization registers (RUR) 130 (130-1, . . . , 130-N). In one embodiment, resource utilization register 130-1 is an instruction issue activity throttle vector 130-1 and resource utilization register 130-N is an instruction fetch activity throttle vector 130-N. Representatively, based on a current bit position of, for example, instruction fetch throttle vector 130-N, processor controller 120 may disable instruction fetch unit 142 during program cycles wherein the current bit value of instruction fetch throttle vector 130-N is de-asserted. However, during program cycles wherein the current bit value of instruction fetch throttle vector 130-N is set, processor controller 120 allows IFU 142 to function according to normal operating conditions. In general, the throttle vectors include counters and limit values to control resources which are not in a simple on or off state by defining a minimum and maximum activity level to a restricted CMP resource.

As further illustrated, in one embodiment, instruction issue throttle vector 130-1 is also monitored by processor controller 120, such that during program cycles wherein the current bit value of instruction issue throttle vector 130-N is de-asserted, processor controller 120 disables instruction issue logic 150. Accordingly, during such cycles of inactivity, power and current consumed by CPU 110 is limited since OOO core 116, as well as execution units 118, will not receive issued instructions and therefore reduces processor resources consumed by CPU 110.

In one embodiment, throttle vectors 130 can limit CPU 110 activity at a finer granularity for improved power rationing. For example, instead of a throttle vector 130 per CPU 110, there could be several. One throttle vector that controls fetch, one that controls floating point (FP) instruction issue, one that controls integer instruction issue, and one that controls memory issue. In addition, certain workloads rarely use FP execution resources. Voltage and frequency points of CMP 100 need to be chosen to account for a sudden burst of activity, which could cause current problems, or sudden voltage droops. Since FP execution is rare, an FP throttle vector could be set up to limit the maximum FP issue rate to 1 every 16 cycles, without adversely affecting performance. Voltage and frequency could now be set higher without fear of an error caused by a burst of FP activity.

Conversely, an HPTC (high performance, technical computing) application may use the FP units extensively. By monitoring actual IPC needs of the FP units voltage and frequency points can be adjusted by power controller 200 or privileged software in response to application needs. In one embodiment, power controller 200 takes advantage of this IPC information and modifies the throttle vectors 130 per CPU 110, as well as voltage and frequency to maximize performance for a variety of workloads with divergent characteristics.

Referring again to FIG. 4, functional units and associated logic of CPU micro-architecture 110 are not required when instructions are not issued. The lack of instruction issue in a given cycle can be anticipated in advance by using processor controller 120 to examine another (future) bit position in the throttle vector 130 to disable critical paths in clock gating logic during one or more detected cycles of CPU inactivity. Accordingly, inhibiting instruction issue results in a reduction in the dynamic current draw and power dissipation of the targeted CPU 110. In addition, limiting a CPU's issue activity does not necessarily decrease its performance linearly with the decrease in issue allowance since CPUs generally do not issue instructions every cycle. Procedural methods for performing one or more embodiments are now described.

Operation

Figure 5:
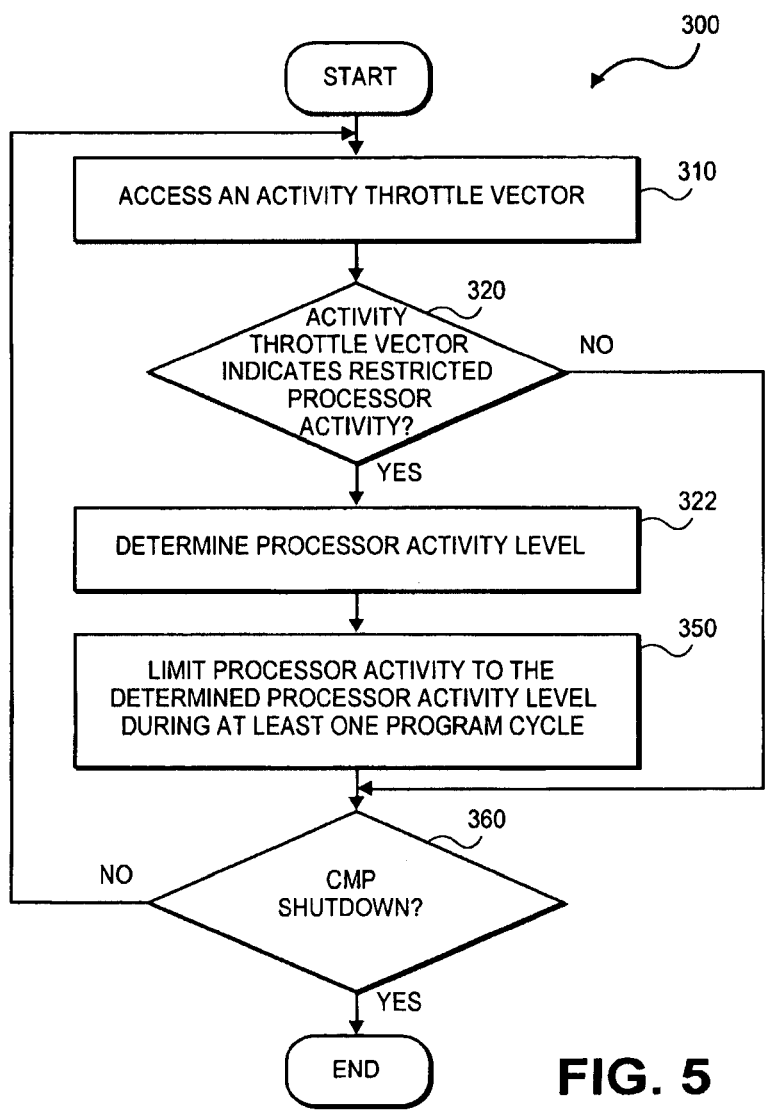
FIG. 5 is a flowchart illustrating a method for limiting processor activity to ration CMP resources, in accordance with one embodiment.

FIG. 5 is a flowchart illustrating a method 300 for resource restriction using a resource utilization register of at least one processor core during at least one program cycle according to a resource utilization policy, in accordance with one embodiment. In one embodiment, the resource utilization register is an activity throttle vector of a processor core (CPU) of a chip multiprocessor (CMP), for example, as illustrated with reference to FIGS. 1-4. In one embodiment, the resource utilization policy specifies processor activity regarding restricted resources including, for example, processor instruction issue, processor instruction fetch, floating point (FP) instruction issue, integer instruction issue, memory issue or other like processor activity to reduce current and power consumption of one or more processor cores and load on shared CMP resources.

Representatively, at process block 310, an activity throttle vector is accessed to identify any resource restrictions. At process block 320, it is determined whether the activity throttle vectors indicates a resource restriction during at least one program cycle. When restricted processor activity is indicated, at process block 322, a resource utilization policy, such as a processor activity level is determined. At process block 350, processor activity is limited to the determined processor activity level according to the resource utilization policy during the at least one program cycle. At process block 360, process blocks 310-350 are repeated in parallel for each processor core of a CMP until CMP shut down is detected.

Figure 6:
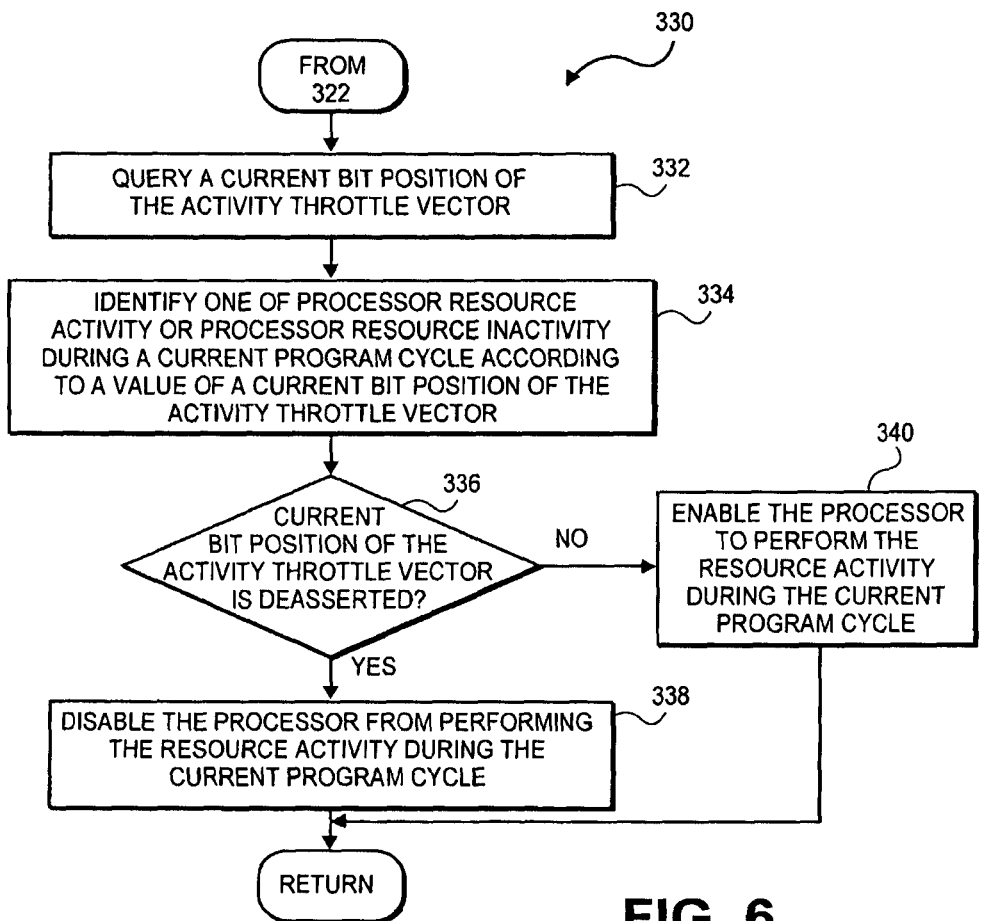
FIG. 6 is a flowchart illustrating a method for restricting processor activity during at least one current program cycle according to a processor activity throttle vector, in accordance with one embodiment.

FIG. 6 is a flowchart illustrating a method 330 for limiting processor activity of process block 322 of FIG. 5, in accordance with one embodiment. At process block 332, a current bit position of the activity throttle vector is queried. At process block 334, the utilization policy specifies a processor activity regarding a restricted resource is enabled or disabled during the current program cycle according to a value of the current bit position of the activity throttle vector. At process block 336, it is determined whether the current bit position of the activity throttle vector is deasserted. When the current bit position of the throttle vector is deasserted, at process block 338, the processor is disabled from performing an activity directed to a restricted resource during the current program cycle. Otherwise, at process block 340, the processor is enabled to perform the resource activity during the current program cycle. In one embodiment, the methods FIGS. 5 and 6 are performed in parallel for each CPU 110 of CMP 100 shown in FIG. 1.

Figure 7:
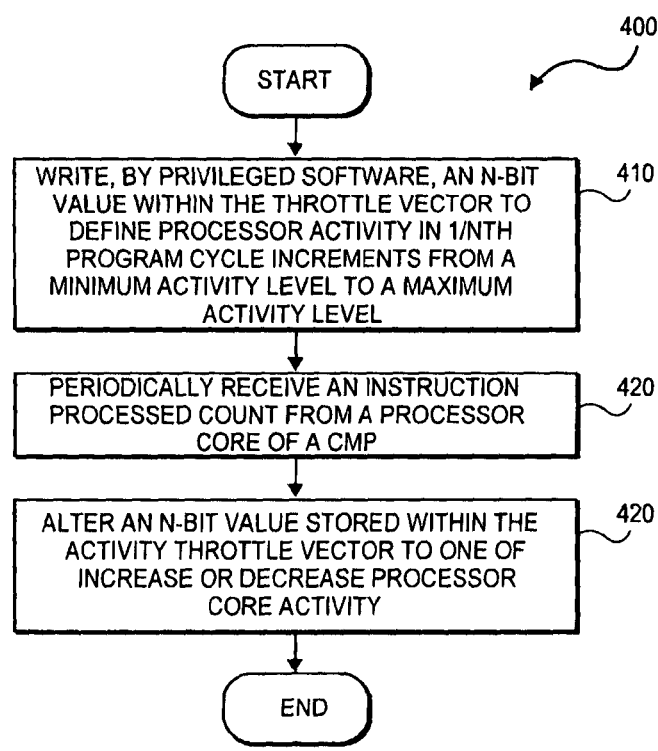
FIG. 7 is a flowchart illustrating a method for populating one or more activity throttle vectors of a CMP to define processor activity in $1/N^{th}$ program cycle increments from a minimum activity to maximum activity level, in accordance with one embodiment.

FIG. 7 is a flowchart illustrating a method 400 for populating one or more activity throttle vectors according to a resource utilization policy that defines processor activity from a minimum activity level to a maximum activity level, in accordance with one embodiment. At process block 410, an N-bit value is written by privileged software within a processor activity throttle vector to define a resource utilization policy such as processor activity in $1/N^{th}$ program cycle increments. In one embodiment, process block 410 is performed in parallel for each processor core of a CMP, for example, as illustrated with reference to FIG. 1. At process block 420, processor core instruction processed count (IPC) is periodically received from each CMP processor core. At process block 430, an N-bit value stored within an activity throttle vector is altered to either increase or decrease process activity. In one embodiment, a resource controller may populate resource control vectors of shared CMP resources to restrict processor core requests per cycle to some defined value.

Figure 8:
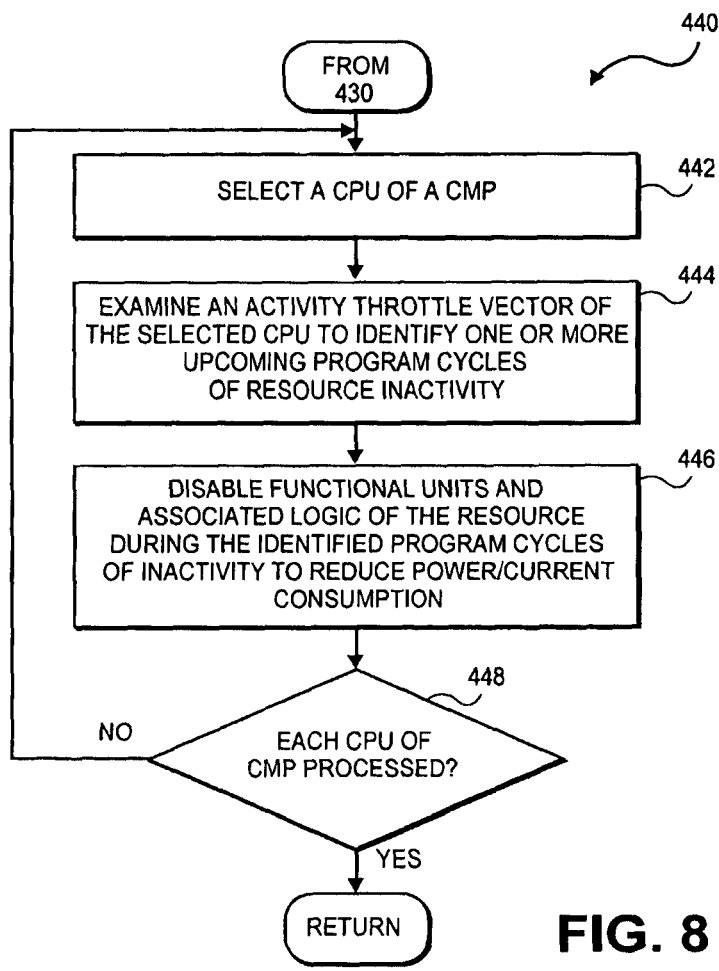
FIG. 8 is a flowchart illustrating a method for disabling resource logic to reduce power/consumption and load on shared resources during restricted activity processor cycles, in accordance with one embodiment.

FIG. 8 is a flowchart illustrating a method 440 for enabling/disabling functional units and associated logic of the CPUs of a CMP according to upcoming processor core resource inactivity, in accordance with one embodiment. At process block 442, a CPU of the CMP is selected. Once selected, at process block 444, the throttle vector of the selected CPU is examined to identify one or more upcoming program cycles of resource inactivity. Once detected, at process block 446, functional units and associated logic of the resource are disabled during the identified program cycles of resource inactivity to reduce power and current consumption of the CMP. At process block 448, process blocks 442-446 are repeated for each CMP CPU.

Figure 9:
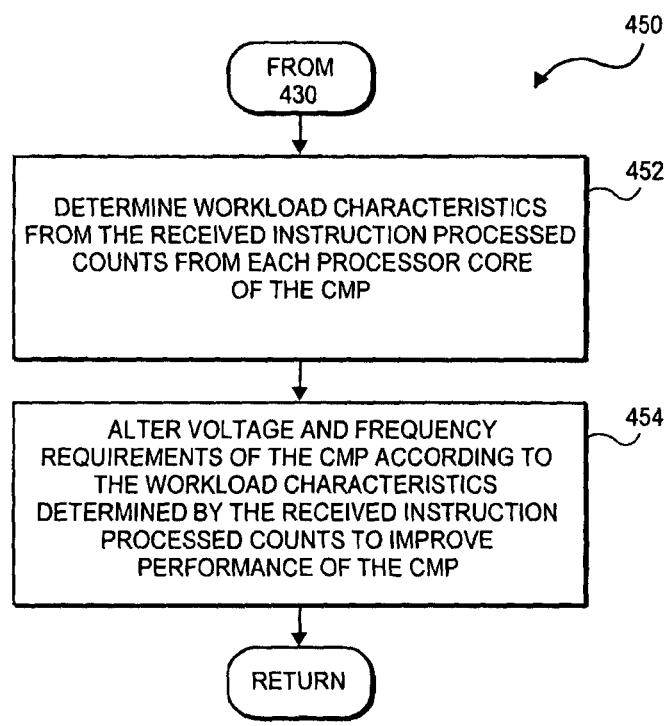
FIG. 9 is a flowchart illustrating a method for altering CMP voltage, frequency and other CMP resource requirements according to instruction process counts received from processor cores of the CMP, in accordance with one embodiment.

FIG. 9 is a flowchart illustrating a method 450 for alternating voltage and frequency requirements of a CMP according to determined workload characteristics of the CMP processor cores, in accordance with one embodiment. At process block 452, workload characteristics are determined for the CMP processor cores according to received IPCs from each CMP processor core. Once determined, at process block 454, voltage and frequency requirements of the CMP may be altered, as determined by the workload characteristics of process block 452.

Accordingly, in one embodiment, a software or hardware controller can take advantage of the workload information to modify the resource utilization registers per CPU, as well as voltage and frequency to maximize performance for a variety of workloads with divergent characteristics. In one embodiment, software can read IPCs, or other feedback collected by the hardware regarding the workload's resource utilization characteristics of each thread running on each processor core. The resource utilization registers can be updated to change resource utilization to better match workload characteristics, and voltage and frequency can be changed to account for the new resource utilization register settings.

In one embodiment, activity throttling shifts power to places where it is most useful. But other resources are also rationed by this technology, albeit indirectly. By throttling a CMP's issue rate, the CPU's load is controlled on system resources, which are then free to service other requests. This is particularly important for controlling access to shared resources such as a third level cache, system locks, main memory, inter-processor links and I/O (input/output).

Figure 10:
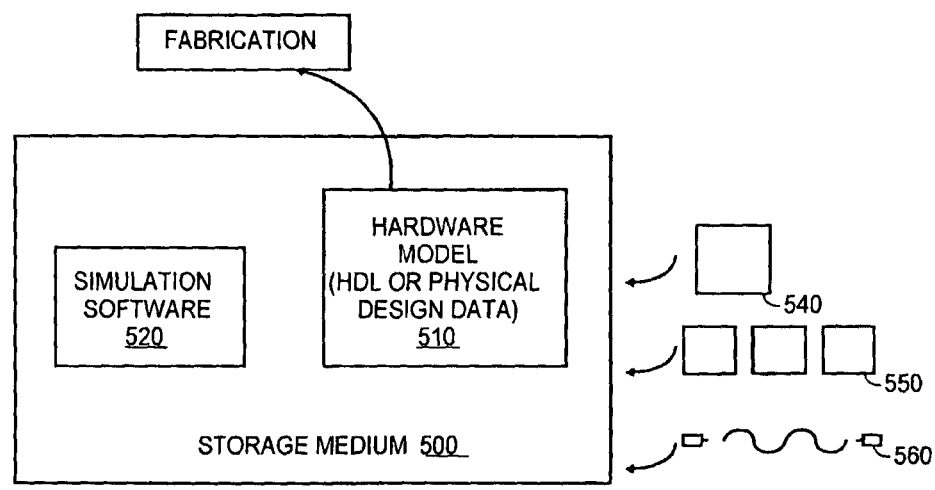
FIG. 10 is a block diagram illustrating various design representations or formats for emulation, simulation and fabrication of a design using the disclosed techniques.

FIG. 10 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

In the above description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic or software without undue experimentation.

In the above description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. In one embodiment, an article of manufacture may include a machine or computer-readable medium having software stored thereon, which may be used to program a computer (or other electronic devices) to perform a process according to one embodiment. The computer or machine readable medium includes but is not limited to: a programmable electronic circuit, a semiconductor memory device inclusive of volatile memory (e.g., random access memory, etc.) and/or non-volatile memory (e.g., any type of read-only memory "ROM", flash memory), a floppy diskette, an optical disk (e.g., compact disk or digital video disk "DVD"), a hard drive disk, tape, or the like.

It will be appreciated that, for other embodiments, a different system configuration may be used. For example, while the system 100 includes a chip multiprocessor system, for other embodiments, a system including at least one processor core may benefit from the processor vector throttling of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A semiconductor die, comprising:
a first processing core and a second processing core both coupled to a processor controller;
said first processing core having a first register, a bit position of said first register to indicate whether said first processing core is permitted to issue an instruction in a given cycle, said first register's contents being writable to define a first percentage of cycles in which said first processing core is permitted to process a next instruction over the course of said first processing core's operation until such time that said first register's contents are changed;
said second processing core having a second register, a bit position of said second register to indicate whether said second processing core is permitted to issue an instruction in a given cycle, said second register's contents being writable to define a second percentage of cycles in which said second processing core is permitted to process a next instruction over the course of said second processing core's operation until such time that said second register's contents are changed; and
wherein said processor controller is to prioritize an issuance of an instruction by said first processing core over an issuance of an instruction by said second processing core when said first percentage is greater than said second percentage.

2. The semiconductor die of claim 1 further comprising a shared cache coupled to said first and second processing cores.

3. The semiconductor die of claim 1 wherein, when said first processing core executes a straggling thread of a multi-threaded application and said second processing core executes an early finishing thread of said multi-threaded application, said processor controller determines said first and second registers' contents such that said first percentage is higher than said second percentage.

4. The semiconductor die of claim 1 wherein, when said first and second processing cores are to execute different threads of a multi-threaded application, said processor controller is to determine said first and second registers' contents such that said first and second percentages are the same.

5. The semiconductor die of claim 1 wherein said first and second processing cores contain statistics logic that report statistics to said processor controller.

6. The semiconductor die of claim 1 wherein said processor controller determines said first and second registers' contents under the control of program code such that said program code defines said first and second percentages.

7. The semiconductor die of claim 1 wherein said hit position of said first register indicates whether said first processing core is permitted to fetch a next instruction.

8. A method, comprising:
writing to a first register of a first processing core instantiated on a semiconductor die to define a first percentage of cycles that said first processing core is permitted to process a next instruction over the course of operation of said first processing core until such time that said first register's contents are changed by a processor controller;
writing to a second register of a second processing core instantiated on said semiconductor die to define a second percentage of cycles that said second processing core is permitted to process a next instruction over the course of operation of said second processing core until such time that said second register's contents are changed by the processor controller; and prioritizing processing of a next instruction by said first processing core over processing of a next instruction by said second processing core when said first percentage is greater than said second percentage.

9. The method of claim 8 wherein said first and second percentages are determined by program code of said processor controller before said writing of said first and second registers.

10. The method of claim 8 wherein said first processing core processes a straggling thread of a multi threaded application, said second processing core processes an early finishing thread of said multithreaded application, and said first percentage is higher than said second percentage.

11. The method of claim 8 wherein said first and second processing cores process different threads of a multi-threaded application and said first and second percentages are the same.

12. The method of claim 8 wherein respective positions of said first and second registers indicate whether said first and second processing cores issue a next instruction.

13. The method of claim 8 wherein respective positions of said first and second registers indicate whether said first and second processing cores fetch a next instruction.

14. A computing system, comprising:
a system memory; and
a processor coupled to said system memory, said processor comprising:
a first processing core and a second processing core both coupled to a processor controller;
said first processing core having a first register, a bit position of said first register to indicate whether said first processing core is permitted to issue an instruction in a given cycle, said first register's contents being writable to define a first percentage of cycles in which said first processing core is permitted to process a next instruction over the course of said first processing core's operation until such time that said first register's contents are changed;

said second processing core having a second register, a bit position of said second register to indicate whether said second processing core is permitted to issue an instruction in a given cycle, said second register's contents being writable to define a second percentage of cycles in which said second processing core is permitted to process a next instruction over the course of said second processing core's operation until such time that said second register's contents are changed; and wherein said processor controller is to prioritize an issuance of an instruction by said first processing core over an issuance of an instruction by said second processing core when said first percentage is greater than said second percentage.

15. The computing system of claim 14 further comprising a shared cache coupled to said first and second processing cores.

16. The computing system of claim 14 wherein, when said first processing core executes a straggling thread of a multi-threaded application and said second processing core executes an early finishing thread of said multi-threaded application, said processor controller determines said first and second registers' contents such that said first percentage is higher than said second percentage.

17. The computing system of claim 14 wherein, when said first and second processing cores are to execute different threads of a multi-threaded application, said processor controller is to determine said first and second registers' contents such that said first and second percentages are the same.

18. The computing system of claim 14 wherein said first and second processing cores contain statistics logic that report statistics to said processor controller.

19. The computing system of claim 14 wherein said processor controller determines said first and second registers' contents under the control of program code such that said program code defines said first and second percentages.

20. The computing system of claim 14 wherein said hit position of said first register indicates whether said first processing core is permitted to fetch a next instruction.

* * * * *

UNITED STATES PATENT AND TRADEMARK OFFICE
CERTIFICATE OF CORRECTION

PATENT NO.         : 8,924,690 B2                                       Page 1 of 1
APPLICATION NO.    : 13/482713
DATED              : December 30, 2014
INVENTOR(S)        : Fossum et al.

It is certified that error appears in the above-identified patent and that said Letters Patent is hereby corrected as shown below:

In the Claims

In column 10, at line 53 delete, "hit" and insert -- bit --.

In column 11, at line 13 delete, "multi threaded" and insert -- multi-threaded --.

In column 11, at line 15 delete, "multithreaded" and insert -- multi-threaded --.

In column 12, at line 37 delete, "hit" and insert -- bit --.

Signed and Sealed this
Twenty-first Day of April, 2015

Michelle K. Lee
*Director of the United States Patent and Trademark Office*